United States Patent [19]

Welburn

[11] 4,284,940

[45] Aug. 18, 1981

[54] ELECTRICAL WAVE SYNTHESIZER FOR CONTROLLING AN ELECTRIC MOTOR

[75] Inventor: Ross Welburn, Santa Rosa, Calif.

[73] Assignee: Compumotion Corporation, Santa Rosa, Calif.

[21] Appl. No.: 67,363

[22] Filed: Aug. 17, 1979

[51] Int. Cl.³ .................. G05B 19/40; H02P 5/06
[52] U.S. Cl. ................................. 318/696; 318/341
[58] Field of Search ................ 318/696, 812, 341

[56] References Cited

U.S. PATENT DOCUMENTS

| 3,906,319 | 9/1975 | Milligan | 318/341 X |
|---|---|---|---|
| 4,087,732 | 5/1978 | Pritchard | 318/685 X |
| 4,100,471 | 7/1978 | Pritchard | 318/685 |
| 4,119,902 | 10/1978 | Newell | 318/696 |
| 4,125,801 | 11/1978 | Leenhouts | 318/696 |

FOREIGN PATENT DOCUMENTS

| 2803201 | 8/1978 | Fed. Rep. of Germany | 318/696 |
| 593296 | 4/1978 | U.S.S.R. | 318/696 |

Primary Examiner—J. V. Truhe
Assistant Examiner—Richard M. Moose
Attorney, Agent, or Firm—Flehr, Hohbach, Test, Albritton

[57] ABSTRACT

A control signal for the drive of a synchronous motor is synthesized in response to direction of rotation and speed digital input signals. The synthesizer includes up-down counters for counting the speed input signal and a toggle circuit tracks the repetitive count of the counters. A digital to analog converter converts the count to an analog current. Distortion of the analog current can be provided to match the motor characteristics and to compensate for temperature variations. The distorted analog current is applied to an operational amplifier which has a non-linear feedback circuit including serially connected resistors and serially connected diodes with each resistor shunted by a diode to limit voltage drop thereacross. A multiplexer receives the output from the operational amplifier and provides the output control signal.

8 Claims, 2 Drawing Figures

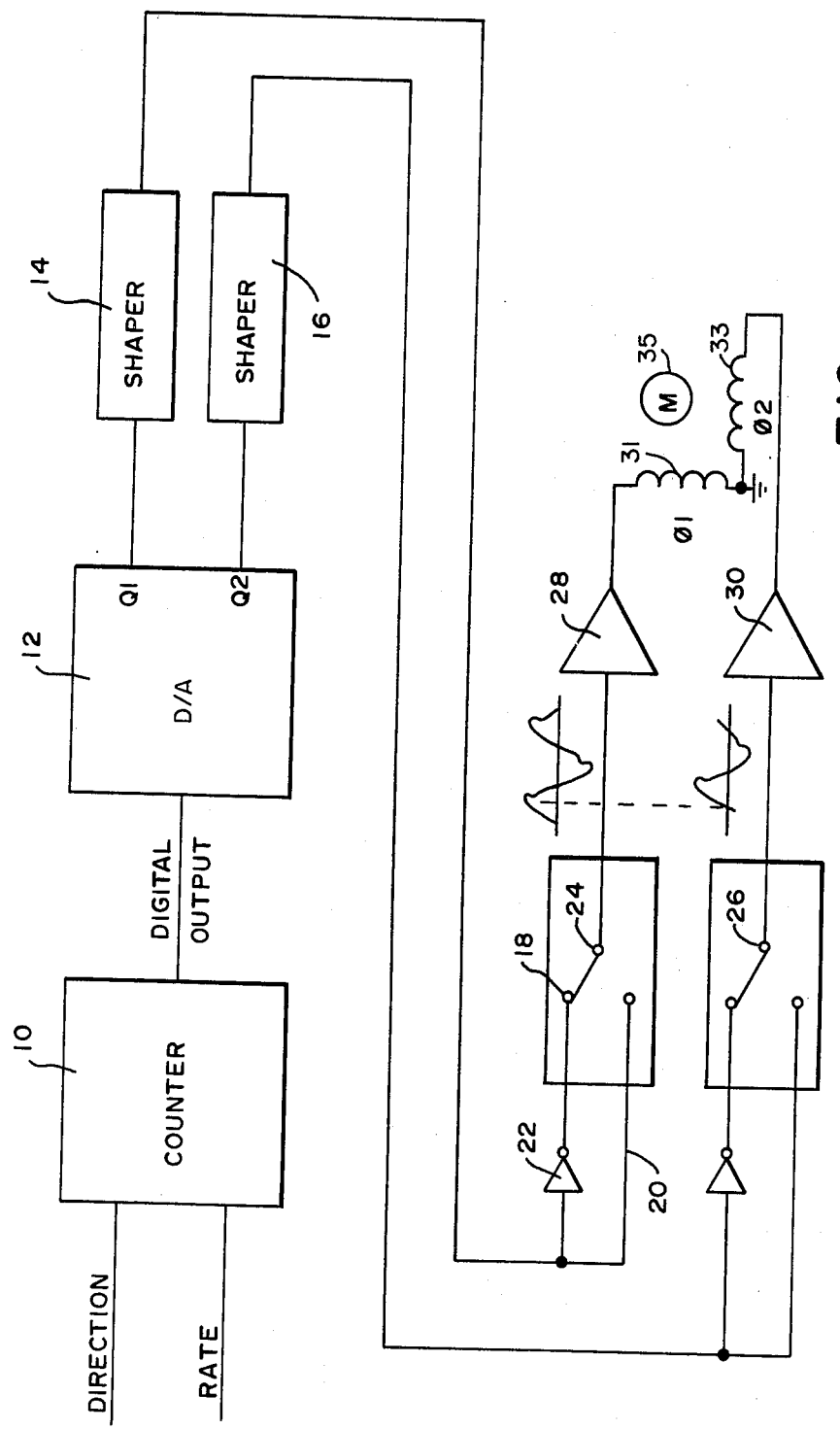
FIG.—1

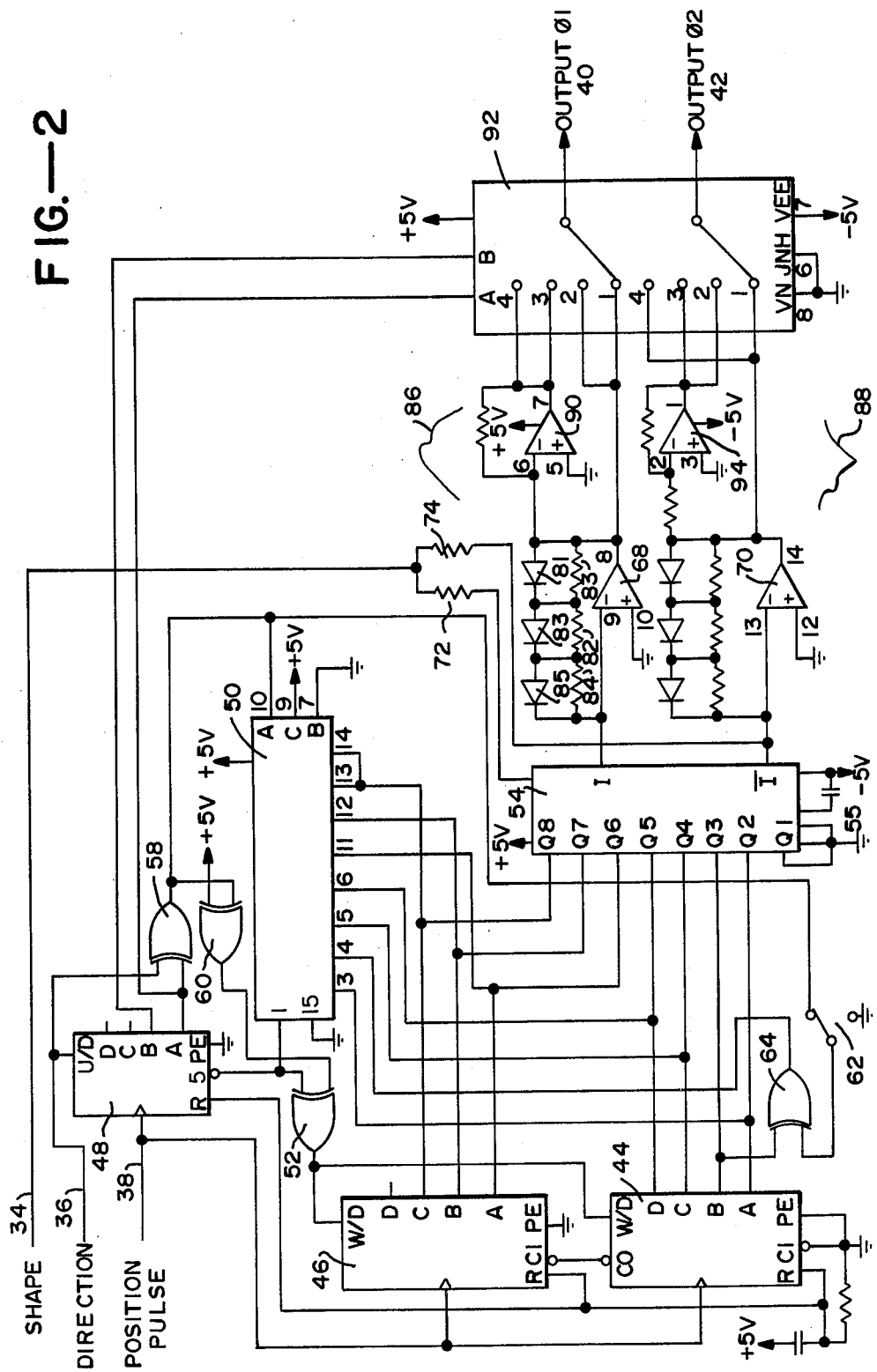

ELECTRICAL WAVE SYNTHESIZER FOR CONTROLLING AN ELECTRIC MOTOR

This application relates to co-pending application Ser. No. 067,364, filed Aug. 17, 1979, for DRIVE CIRCUITRY FOR ELECTRIC MOTOR, assigned to the present assignee.

This invention relates generally to electric motor control circuits, and more particularly the invention relates to circuits for synthesizing a control signal for controlling the drive current applied to the winding of a motor.

In driving synchronous motors such as stepping motors the field windings are energized in sequential steps which cause the armature of the motor to rotate in a corresponding step by step manner. Numerous control circuits have been designed which respond to direction and speed or rate input signals and provide a control signal to power amplifiers which energize field windings and drive the motor. For example, U.S. Pat. No. 4,087,732 issued May 2, 1978, for DIGITAL STEPPING MOTOR DEVICE CIRCUIT discloses control circuitry which generates a control signal in steps of equal amplitude but unequal duration. This circuit includes a memory which is addressed by a counter and provides a digital amplitude signal which is then converted to an analog signal to control power amplifiers. U.S. Pat. No. 4,100,471 issued July 11, 1978, for STEPPING MOTOR CONTROL CIRCUIT utilizes a resistive voltage divider network for generating a distorted control signal which compensates for a non-linear motor transfer function.

U.S. Pat. No. 3,906,319 issued Sept. 16, 1975, for A UNIVERSAL MOTOR SPEED CONTROL SYSTEM pulse signals with controlled gradually increasing amplitude levels which are applied to a motor to maintain it at a desired speed under variable loading conditions.

These and other control circuits heretofore known are typically designed to operate with a specific motor having unique characteristics and specific applications. Accordingly, the control circuits are not readily modified as by computer control means to function with various motors having different characteristics or to control motors in different operating environments.

Accordingly, an object of the present invention is an improved electrical wave synthesizer for controlling an electric motor.

Another object of the invention is a control system for a synchronous motor and the like which may be readily computer controlled.

In accordance with the invention, the electrical wave synthesizer is responsive to direction and speed input signals and provides an analog control signal with predetermined distortion for controlling an electric motor and includes counter means for receiving and counting electrical pulses indicative of speed, digital to analog conversion means for receiving count from the counter means and generating an analog signal response thereto, shaping means for receiving and shaping the analog signal, and multiplexer means for receiving the shaped analog signal and developing a full wave alternating polarity control signal.

More specifically, the counter means comprises up-down count means and toggle means for indicating the mode of count. The multiplexer means is responsive to the toggle means for establishing the polarity of the control signal.

In accordance with one feature of the invention the shaping means comprises an operational amplifier having an input terminal for receiving an analog signal and having a feedback circuit connected between the output terminal of the amplifier and the input terminal with the feedback circuit comprising a plurality of serially connected resistors and a plurality of serially connected diodes. Each of the resistors is electrically shunted by one of the diodes thereby limiting the voltage drop across each resistor and providing a non-linear response for the operational amplifier.

In accordance with another feature of the invention distortion means is provided for distorting the analog signal applied to the input terminal of the operational amplifier whereby the non-linear response of the operational amplifier to the analog signal can be readily varied.

These and other objects and features of the invention will be more readily apparent from the following detailed description and appended claims when taken with the drawing.

In the drawing,

FIG. 1 is a functional block diagram of stepping motor control circuitry in accordance with the invention.

FIG. 2 is a schematic of a two phase electrical wave synthesizer in accordance with one embodiment of the present invention.

Referring now to the drawings, FIG. 1 is a functional block diagram of control circuitry for a stepping motor device. The circuit includes an up-down counter 10 which responds to a direction of rotation signal and a rate or speed signal to generate a count. Each count has associated therewith a digital word indicative of the magnitude of field current for particular positioning of the motor. For example, the counter may have associated therewith a number of positions of a full wave of field current. The magnitude of the field current at the associated position of the counter is indicated by the digital word, and the digital word is applied to a digital to analog converter 12 which converts the digital words to an analog signal. In this particular embodiment the circuitry drives a two phase motor and the output of the digit to analog converter is applied to wave shapers 14 and 16 which may apply any necessary distortion to the analog signal to correct for distortion in the magnitude and torque characteristics of the motor. The output signals from shapers 14 and 16 will have essentially the same shape with one output leading the other output by a one-fourth cycle or 90 electrical degrees. Assuming that the output signal from the shapers varies from a minimum value of zero to a maximum value, the signal can be applied to an analog multiplexer 18 directly through line 20 or through an inverter 22 with switches 24 and 26 of multiplexer 18 alternating between the line 20 and converter 22 to generate an alternating current wave as illustrated.

The control signals from multiplexer 18 are then applied to power amplifiers 28 and 30 to drive the field winding 31 and 33 of the motor 35. The control signals are particularly useful with the drive circuitry disclosed in co-pending application Ser. No. 067,364, supra.

As above described, prior art motor control circuits are typically designed for a particular motor and application, and the control circuits are not readily modified for use with different motors or for different applications.

Accordingly, the control circuits do not lend themselves for operation with computer systems which can more accurately control the energization of a synchronous motor and the like with added flexibility in modifying the energization of a motor for a specific application.

FIG. 2 is a schematic of a control circuit in accordance with one embodiment of the present invention which readily lends itself to computer control. The synthesizer responds to a shape or distortion signal at input 34, a direction signal at input 36, and a position signal at input 38, and generates two output phase control signals at 40 and 42. The distortion signal at input terminal 34 may be a current which is used to offset an analog signal and thereby provide a distortion effect in shaper circuitry, as will be described. The direction signal applied at input terminal 36 may be one of two binary states, for example, a "0" for a clockwise rotation and a "1" for a counter-clockwise rotation. The position pulse applied to input terminal 38 will be a pulse stream the frequency of which determines the desired speed of a controlled motor. For example, one cycle of the synthesized control signal may be divided into 500 parts with the pulse train for the position pulse requiring 500 pulses to generate one cycle of the control signal. The output signals at terminals 40 and 42 may be distorted sine waves, as illustrated, with the signal at terminal 40 leading the signal at terminal 42 by 90°.

The position pulse train from input terminal 38 is applied to the clock input terminals of three up-down counters 44, 46, and 48. In a preferred embodiment the counters are four bit counters with counter 44 interconnected to drive counter 46, thereby achieving a maximum count of 16 times 16 or 256 count. As will be described, counters 44 and 46 are periodically reset to repetitively count up to 125 and down to zero. Counter 48 is utilized as a toggle to track whether the count is up or down for the counters 44 and 46. The reference numerals are for Motorola CD 4516 sixteen bit up-down counters.

The direction input signal at terminal 36 (e.g. "0" for CW; "1" for CCW) is applied to the up-down input U/D of counter 48, and counter 48 responds to the output signal from exclusive OR gate 50 to generate outputs on terminals A and B to control a multiplexer, as will be described hereinbelow.

The A, B, C, and D outputs of counters 44 and 46 are interconnected to the inputs of exclusive OR gate 50, and gate 50 responds to a count of 125 and produces an output on terminal 1 which is interconnected to input 5 of toggle counter 48 and is interconnected through exclusive OR gate 52 to change the up-down control signal on terminal 10 of counters 44 and 46. Thus, gate 50 cycles counters 44 and 46 between a count up and a count down state for every 125 pulses whereby counters 44 and 46 cooperatively count up to 125 and then count back down to zero on a repetitive basis.

The outputs of counters 44 and 46 are applied also to a digital to analog converter 54 which responds to the binary count from the counters and generates two output currents which linearly vary from zero to one milliamp for the "I" and "Ī" outputs. Thus, the outputs on I and Ī are triangular waves which are 180° out of phase. In a preferred embodiment the digital to analog converter may a DAC 08 which is manufactured by Precision Monolithics Incorporated. This particular device requires bias voltages connected to the terminals 1, 3, 12, 15, and 16 as illustrated with capacitor 55 being 0.01 micro-farads.

The direction signal connected to input terminal 36 is applied also through exclusive OR gate 58 to an exclusive OR gate 60, gate 50, and through a switch 62 to an input of exclusive OR gate 64. The output of exclusive OR gate 60 is connected to one input of exclusive OR gate 52 and establishes the initial direction of count for counters 44 and 46 in response to the desired direction of motor rotation. Thereafter, counters 44 and 46 repetitively cycle between an up count to 125 and a down count back to zero. Gate 64 responds to the inputs from switch 62 and from the B output of counter 44 and is connected to input 4 of gate 50 whereby gate 50 alters the counting of counters 44 and 46.

The triangular current wave outputs from converter 54 are applied to the inputs of operational amplifiers 68 and 70 which shape the triangular waves. Advantageously, the linear output from converter 54 may be pre-distorted by applying a distortion current signal to the input terminal 34 which is interconnected through resistors 72 and 74 to converter 54. The distortion current signal can compensate for the temperature variation of the operational amplifiers 68 and 70.

Operational amplifier 68 receives the I output of converter 54 for generating the phase one ($\phi 1$) output signal at output terminal 40, and operational amplifier 70 receives the $\overline{I}$ output from converter 54 for generating the control signal for phase two ($\phi 2$) at output terminal 42. Operation amplifier 68 shapes the input signal through the provision of a non-linear feedback circuit comprising serially connected resistors 80, 82, and 84 and serially connected diodes 81, 83, and 85. Each of the resistors is shunted by one of the diodes whereby the voltage drop across each resistor is limited by the voltage drop of the diode, or approximately 0.6 volt. Thus, operational amplifier 68 and operational amplifier 70 operate non-linearly on their respective input signals.

The output of operational amplifier 68 is a distorted wave as illustrated at 86 which varies from a zero value to a maximum value back to the zero value in response to the I output of converter 54. Similarly, operational amplifier 70 produces the wave 88 which is of a similar configuration but which starts at a maximum value, decreases to zero and returns to a maximum value since the phase of the I output is leaving the phase of the I output. The output of operation amplifier 68 is then applied through an inverter 90 and by a direct path to terminals of multiplexer 92. Similarly, the output of operational amplifier 70 is passed though an inverter 94 and directly to terminals of multiplexer 92. Multiplexer 92, which may be a Motorola CD 4052 integrated circuit, has its A and B input terminals connected to the A and B output terminals of counter 48 and responds thereto to selectively apply the outputs of amplifiers 68 and 70 either directly or inverted to the output terminals 40 and 42, respectively.

In the embodiment in which the counters count up and down between zero and 125 pulses, the A and B outputs of the toggle counter 48 may assume one of four binary states which change upon each toggle of counter 48. Thus, for every count of 125 pulses the state of the output counter toggle 48 changes, and the interconnection of multiplexer 92 thus changes for every 125 counted pulses. For example, output terminal 40 is interconnected through terminals 1-4 with the true outputs of operational amplifier 68 during a half cycle and then with the inverted output of operational amplifier 68 during the last half cycle to thereby produce the full wave signal at output terminal 40. Since the output of operational amplifier 70 leads the phase of the output of operational amplifier 68 by 90°, output 42 is multiplexed from the real output of amplifier 70 to the inverted output from inverter 94 and eventually back to the real output of operational amplifier 70 to generate the output signal at terminal 42 which leads the output signal at terminal 40.

Thus, the described control voltage synthesizer responds to a position pulse train by generating a binary count which is applied to a digital to analog converter to obtain an analog signal corresponding to the desired motor speed and position. The analog signal is distorted and then applied to a shaping network to obtain a desired shape of control signal which may match the magnetic and torque characteristics of the driven motor. The shaped signal is applied to an output multiplexer which generates the full wave control signal.

In a specific embodiment, the following components were utilized:

| | |
|---|---|
| Counter 44 | Motorola CD 4516 |
| Counter 46 | Motorola CD 4516 |
| Counter 48 | Motorola CD 4516 |
| Gate 50 | Motorola CD 4048 |
| Gate 52 | Motorola CD 4070 |
| Gate 58 | Motorola CD 4070 |
| Gate 60 | Motorola CD 4070 |
| Gate 64 | Motorola CD 4070 |
| Converter 54 | PMI DAC 08 |
| Op Amp 68 | Fairchild 774 |
| Op Amp 70 | Fairchild 774 |
| Inverter 90 | Fairchild 774 |
| Interter 94 | Fairchild 774 |
| Multiplexer 92 | Motorola CD 4052 |
| Doides 81-85 | 1 N 43 Ω |
| Resistor 72 | 1.2 K Ω |
| Resistor 74 | 100 K Ω |
| Resistor 80 | 3.3 K Ω |
| Resistor 82 | 2.7 K Ω |
| Resistor 84 | 2.2 K Ω |

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. An electrical wave synthesizer responsive to direction and speed input signals and providing an analog control signal for controlling an electric motor comprising counter means for receiving and counting electrical pulses indicative of speed, digital to analog conversion means for receiving count from said counter means and generating an analog signal in response thereto, non-linear amplifier means for receiving and distorting said analog signal, and multiplexer means for receiving the distorted analog signal from said nonlinear amplifier means and developing a full wave alternating polarity control signal.

2. An electrical wave synthesizer as defined by claim 1 wherein said counter means comprises up-down counter means responsive to direction of rotation input signals for sequencing the up and down count thereof.

3. An electrical wave synthesizer as defined by claim 2 wherein said counter means provides a binary count of said pulses.

4. An electrical wave synthesizer as defined by claim 3 wherein said digital to analog conversion means generates a ramp current signal in response to said count.

5. An electrical wave synthesizer as defined by claim 1 or 4 wherein said non-linear amplifier means comprises an operational amplifier having an input terminal for receiving said analog signal, an output terminal, and a feedback circuit connected between said output terminal and said input terminal, said feedback circuit comprising a plurality of serially connected resistors and a plurality of serially connected diodes, each of said resistors being electrically shunted by one of said diodes thereby limiting the voltage drop across each of said resistors.

6. An electrical wave synthesizer as defined by claim 5 wherein said multiplexer means includes an output terminal, converter means for inverting said distorted analog signal, and switch means for selectively applying said distorted analog signal and the inverted distorted analog signal to said output terminal.

7. An electrical wave synthesizer as defined by claim 6 wherein said up-down counter means includes a control terminal responsive to first and second signals for counting up and counting down, toggle means having two states, and a toggle input for establishing one state when said counter means is counting up and establishing the other state when said means is counting down, said multiplexer means being responsive to said states of said toggle means for selectively applying said shaped analog signal and said inverted analog signal to said output terminal.

8. An electrical wave synthesizer as defined by claim 7 wherein said distortion means comprises means for applying an offset signal to said analog signal.

* * * * *